Dec. 29, 1925.  
I. S. WELLS  
AIR SYSTEM FOR TIRES  
Filed April 25, 1923
1,567,779
2 Sheets-Sheet 1
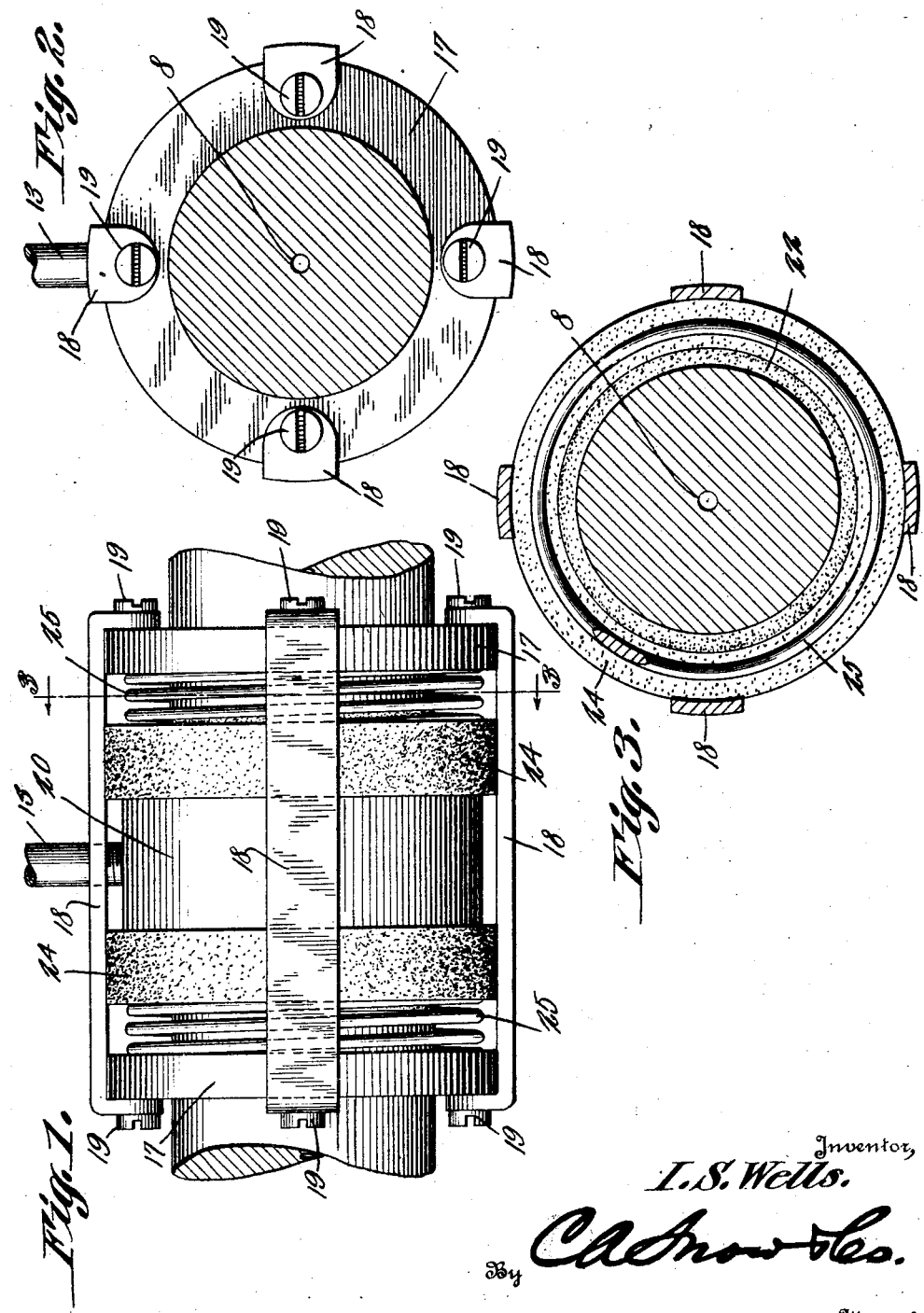
Inventor,  
I. S. Wells.
By
Attorneys Dec. 29, 1925.  
I. S. WELLS  
AIR SYSTEM FOR TIRES  
Filed April 25, 1923  
1,567,779  
2 Sheets-Sheet 2
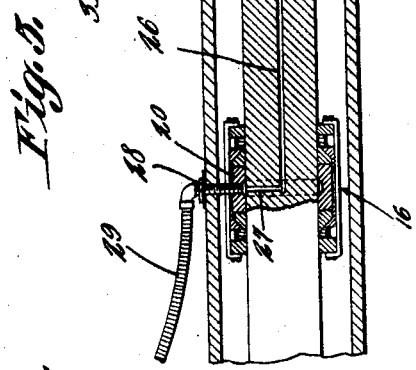
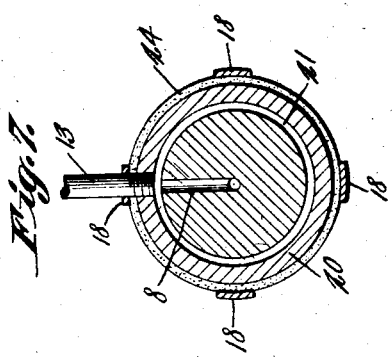
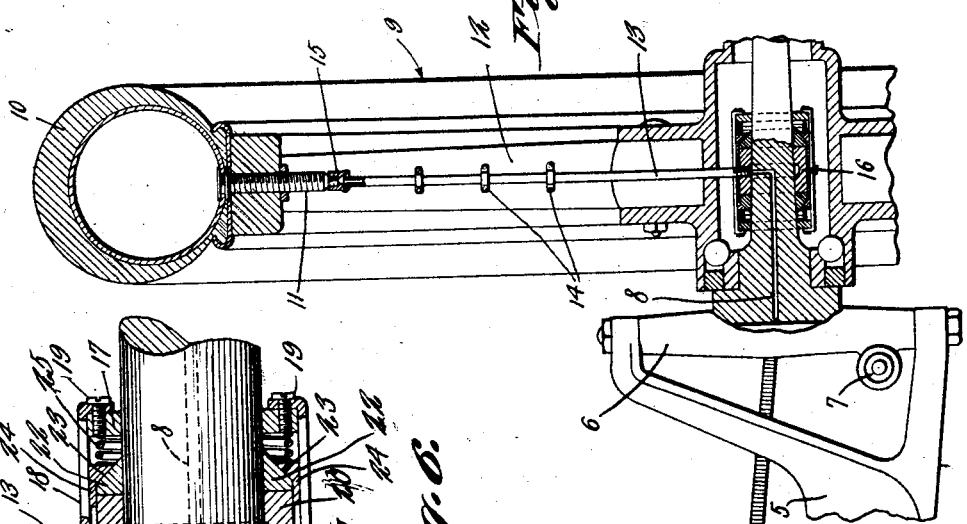
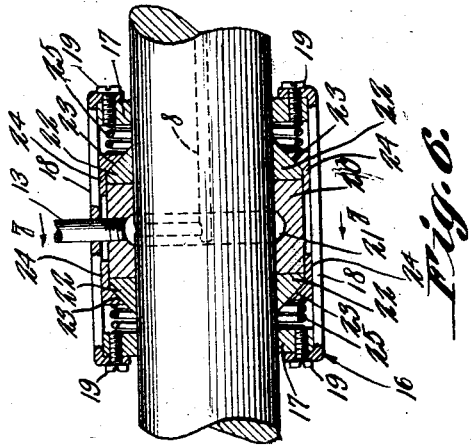
Inventor  
I. S. Wells.  
By C. A. Snow & Co.  
Attorney Patented Dec. 29, 1925.

1,567,779

UNITED STATES PATENT OFFICE.

ISAAC SIDNEY WELLS, OF LAUREL, MISSISSIPPI.

AIR SYSTEM FOR TIRES.

Application filed April 25, 1923. Serial No. 634,639.

*To all whom it may concern:*

Be it known that I, ISAAC SIDNEY WELLS, a citizen of the United States, residing at Laurel, in the county of Jones and State of Mississippi, have invented a new and useful Air System for Tires, of which the following is a specification.

This invention relates to means whereby pneumatic tires may be readily inflated while the vehicle supplied with the tires, is moving, thereby obviating the necessity of stopping the vehicle to inflate the tires.

Another object of the invention is to provide an air-tight connection between the movable and stationary elements of the device, to insure the entire quantity of air passing to the tire being inflated.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of the connecting member employed for connecting the pipe carried by the rotary member to the stationary member that supplies air to the tire.

Figure 2 is an end elevational view of the connecting member.

Figure 3 is a sectional view taken on line 3—3 of Figure 1.

Figure 4 is a fragmental sectional view through the front wheel and stub axle of a vehicle.

Figure 5 is a fragmental sectional view disclosing the connection between the rear axle and wheels supported thereon.

Figure 6 is an enlarged sectional view through the stuffing box or connecting means.

Figure 7 is a sectional view taken on line 7—7 of Figure 6.

Referring to the drawings in detail, the reference character 5 designates the front axle of a motor vehicle, which is of the usual construction, and is supplied with a stub shaft 6 that has connection with the steering mechanism 7 in the usual manner.

This stub shaft is formed with a bore 8 extending from the inner end of the stub shaft terminating at a point substantially intermediate the ends thereof, where the bore extends at right angles and terminates at the surface of the stub axle. The wheel supported on the stub axle is indicated at 9 and revolves around the stub axle, the wheel being supplied with the usual pneumatic tire 10 which is provided with the usual valve 11, the valve in the present showing however being disposed at a point adjacent to the spoke 12 of the wheel.

This spoke 12 supports a pipe 13 which is secured to the spoke by means of the securing clips 14, the outer ends of the pipe 13 having connection with the valve 11 at 15. The inner end of the pipe 13 extends into the stuffing box or connecting member 16 which embodies end plates 17 held in suitable spaced relation with each other by means of the connecting bars 18 that have right angled ends formed with openings accommodating the bolts 19.

Forming a part of the connection 16 is a collar 20 supported on the axle associated therewith, the collar being formed with a groove 21 adapted to house the discharge end of the bore 8 so that when air passes through the bore, the groove will be filled with air to supply the pipe 13, which is shown as having one end thereof positioned in a threaded opening of the collar 20. Thus it will be seen that the pipe 13 and connection employed for connecting the pipe and axle may revolve with the connection and at the same time receive air through the bore 8.

In order that the collar 20 will be held in its proper position on the shaft, packing rings 22 are provided at the opposite ends of the collar, the packing ring having outer inclined surfaces 23 that are engaged by the inclined surfaces of the rings 24 to set up a camming action to force the rings 22 into close engagement with the collar and shaft on which the rings are positioned.

Disposed between the end plates 17 and the rings 24 are coiled springs 25 that are designed to normally urge the rings 24 into close engagement with the rings 22 to insure a fluid-tight connection. This construction also compensates for wear between the axle and packing rings to force the packing rings into close engagement with the elements associated therewith.

As shown by Figure 5 of the drawings, the invention is applied to the rear axle of a motor vehicle, which is formed with a bore 26 which has a right angled extremity 27 terminating at a point adjacent to the periphery of the axle where the same is housed by the collar 20 of the connecting member. The pipe 28 extends into the collar 20 to supply air thereto, the pipe 28 being in communication with a suitable source of air supply through the pipe 29.

30 designates a rear wheel supplied with a tire 31 which is supplied with the usual valve stem 32 that has communication with the bore 26 through the pipe 33. It might be further stated that in the use of the device, it is contemplated to provide a suitable motor actuated pump which may be controlled from the instrument board of a vehicle, suitable valve members not shown being also provided to control the passage of air to the pneumatic tires.

In the use of the device, if it is necessary to inflate a tire, air is supplied to the connection to the bore of the axle supporting the wheel and tire mounted thereon to be inflated, whereupon the air may pass to the tire in a manner as described, eliminating the necessity of stopping the motor vehicle to inflate the tire.

Having thus described the invention, what is claimed as new is:—

In a device of the character described, an axle having a bore, one end of the bore extending laterally and terminating at the surface of the axle, a collar having a groove, said groove being disposed adjacent to the lateral extension of the bore to admit fluid therefrom, a pipe extending through the collar and communicating with the groove to admit fluid therefrom, a frame including bars having right angled extremities, end plates to which the right angled extremities are secured, rings having inclined outer surfaces and engaging the collar, rings having inclined edges engaging the first mentioned rings, and resilient members arranged between the end plates and last mentioned rings to urge the ring members towards the collar.

In testimony that I claim the foregoing as my own, I have hereto affixed my signature.

ISAAC SIDNEY WELLS.